United States Patent
Nath et al.

(10) Patent No.: US 9,746,550 B2
(45) Date of Patent: Aug. 29, 2017

(54) DETECTING LOW-SPEED CLOSE-RANGE VEHICLE CUT-IN

(71) Applicant: Ford Global Technologies, LLC, Dearborn, MI (US)

(72) Inventors: Nitendra Nath, Troy, MI (US); Aaron L. Mills, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 14/509,348

(22) Filed: Oct. 8, 2014

(65) Prior Publication Data

US 2016/0103212 A1 Apr. 14, 2016

(51) Int. Cl.
*G01S 13/04* (2006.01)
*G01S 13/93* (2006.01)

(52) U.S. Cl.
CPC ............ *G01S 13/04* (2013.01); *G01S 13/931* (2013.01)

(58) Field of Classification Search
CPC .............................. G01S 13/04; G01S 13/931
USPC ........................................................... 342/28
See application file for complete search history.

(56) References Cited

U.S. PATENT DOCUMENTS

| | | | |
|---|---|---|---|
| 6,679,702 B1 * | 1/2004 | Rau | G09B 9/02 340/435 |
| 6,903,680 B2 | 6/2005 | Samukawa et al. | |
| 8,055,428 B2 | 11/2011 | Okawa | |
| 8,760,276 B2 | 6/2014 | Yamazato | |
| 9,261,590 B1 * | 2/2016 | Brown | G01S 13/10 |
| 2005/0128133 A1 * | 6/2005 | Samukawa | G01S 17/936 342/70 |
| 2005/0171675 A1 | 8/2005 | Sawamoto et al. | |
| 2008/0243351 A1 | 10/2008 | Isogai et al. | |
| 2010/0087984 A1 * | 4/2010 | Joseph | G09B 19/16 701/31.4 |
| 2010/0198478 A1 * | 8/2010 | Shin | B60W 10/06 701/96 |
| 2013/0226433 A1 * | 8/2013 | Tominaga | B60W 50/0097 701/96 |

FOREIGN PATENT DOCUMENTS

| | | |
|---|---|---|
| JP | H0789367 A | 4/1995 |
| JP | H09223235 A | 8/1997 |
| JP | 2765310 | 4/1998 |
| JP | H11321379 A | 11/1999 |
| JP | 2002334330 A | 11/2002 |

(Continued)

OTHER PUBLICATIONS

GB Search Report dated Mar. 11, 2016 (4 pages).

(Continued)

*Primary Examiner* — Timothy A Brainard
(74) *Attorney, Agent, or Firm* — Frank MacKenzie; Bejin Bieneman PLC

(57) ABSTRACT

A vehicle system includes an input device interface and a processing device. The input device interface receives a radar signal. The processing device defines a region of interest between a host vehicle and a front vehicle, detects that a potential cut-in vehicle has entered the region of interest, and selects the potential cut-in vehicle as the new front vehicle. The vehicle system may be incorporated into an autonomous or partially autonomous vehicle.

18 Claims, 4 Drawing Sheets

(56) References Cited

FOREIGN PATENT DOCUMENTS

| JP | 2008117073 A | 5/2008 |
|---|---|---|
| KR | 20090128873 | 12/2009 |

OTHER PUBLICATIONS

2020HORIZON.com, A Forward Looking Radar Sensor for Adaptive Cruise Control with Stop & Go and Cut in Situations Capabilities implemented using MMIC technologies.(DENSETRAFFIC), Funded under 5th FWP (Fifth Framework Programme) Research area: 2000-1.5.2 Intelligent Vehicle Systems (2 pages).

* cited by examiner

DETECTING LOW-SPEED CLOSE-RANGE VEHICLE CUT-IN

BACKGROUND

Autonomous and partially autonomous vehicles assume certain driving-related tasks from the person who would otherwise drive the vehicle. Various sensor systems allow the autonomous vehicle to detect other cars, infrastructure, pedestrians, or the like. Autonomous and partially autonomous vehicles process the outputs of the sensor systems to operate the vehicle as if it were being driven by a human.

BRIEF DESCRIPTION OF THE DRAWINGS

FIG. 3 illustrates a view from a host vehicle during a potential vehicle cut-in.

FIG. 4 illustrates a view from a host vehicle during another potential vehicle cut-in.

DETAILED DESCRIPTION

While autonomous and partially autonomous vehicles attempt to mimic human behavior, certain circumstances that sometimes occur when operating a vehicle are difficult to emulate. For example, it is difficult for on-board vehicle cameras to detect a close range cut-in vehicle—that is, a vehicle that is attempting to enter the autonomous vehicle's lane between the autonomous vehicle and a front vehicle at a very short distance. Cut-in situations occur frequently when driving in populated areas but can be problematic for autonomous vehicles at low speeds whether the autonomous vehicle is equipped with a camera, radar, or both. First, it is difficult for autonomous vehicles equipped with cameras to recognize cut-in vehicles that cut in at a close range because in this case, the rear of the vehicle may not be fully visible and the camera systems may not be trained sufficiently in order to detect side of the vehicle. Second, cut-in vehicles approach the autonomous vehicle laterally, and traditional radar systems sometimes have difficulty detecting lateral movement when the autonomous vehicle or cut-in vehicle is moving slowly. Third, a radar system, during this event, may only detect the front of the cut-in vehicle and the host vehicle will respond to this detection rather than the rear of the cut-in vehicle. This may require driver's intervention to prevent a collision.

An example vehicle system that can detect potential cut-ins using radar system signals includes an input device interface and a processing device. The input device interface receives the radar signal. The processing device defines a region of interest between a host vehicle and a front vehicle, detects that a potential cut-in vehicle has entered the region of interest, and selects the potential cut-in vehicle as the new front vehicle. The vehicle system may be incorporated into an autonomous or partially autonomous vehicle.

The elements shown may take many different forms and include multiple and/or alternate components and facilities. The example components illustrated are not intended to be limiting. Indeed, additional or alternative components and/or implementations may be used.

Figure 1:
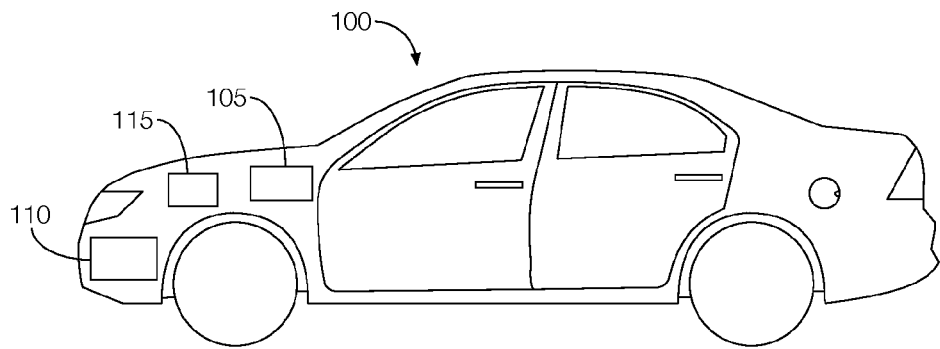
FIG. 1 illustrates an example autonomous vehicle with a system for detecting low-speed, close-range vehicle cut-ins.

FIG. 1 illustrates an example autonomous or partially autonomous host vehicle 100 with a system 105 for detecting low-speed, close-range vehicle cut-ins. Although illustrated as a sedan, the host vehicle 100 may include any passenger or commercial automobile such as a car, a truck, a sport utility vehicle, a crossover vehicle, a van, a minivan, a taxi, a bus, etc. To implement autonomous or partially autonomous functions, the host vehicle 100 may include a radar system 110 and an autonomous mode controller 115.

The radar system 110 may include any number of devices configured to generate signals that help navigate the vehicle while the vehicle is operating in the autonomous (e.g., driverless) mode. The radar system 110 may include, for example, any number of radar sensors. Each radar sensor may output a radio frequency (RF) signal, and nearby objects may be detected from reflections of the RF signal. The radar system 110 may output a radar signal indicating a potential low-speed, close-range vehicle cut-in. That is, the radar signal may represent that a vehicle (referred to below as a "cut-in vehicle") is attempting to cut-in between the host vehicle 100 and a front vehicle (e.g., the vehicle immediately in front of the host vehicle 100).

The autonomous mode controller 115 may be configured to control one or more subsystems while the host vehicle 100 is operating in the autonomous mode. Examples of subsystems that may be controlled by the autonomous mode controller 115 may include a brake subsystem, a suspension subsystem, a steering subsystem, and a powertrain subsystem. The autonomous mode controller 115 may control any one or more of these subsystems by outputting signals to control units associated with these subsystems. The autonomous mode controller 115 may control the subsystems based, at least in part, on signals generated by the radar system 110.

Figure 2:
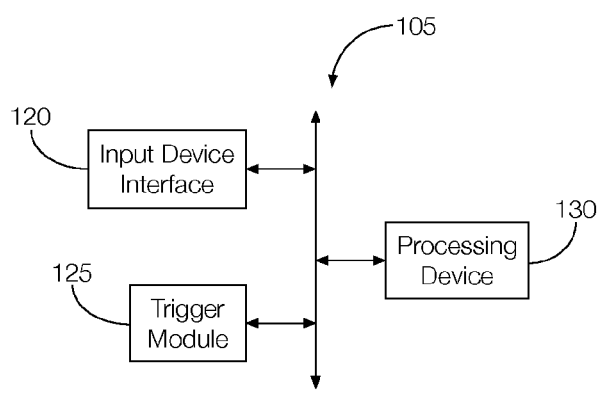
FIG. 2 is a block diagram of an example vehicle system that may be used in the autonomous vehicle of FIG. 1.

FIG. 2 is a block diagram of an example vehicle system 105 that may be used in the autonomous host vehicle 100 of FIG. 1. The system 105, as shown, includes an input device interface 120, a trigger module 125, and a processing device 130.

The input device interface 120 may be configured to receive a radar signal. The radar signal, as discussed above, may be output by the radar system 110. In one possible approach, the radar signal may indicate the presence of a potential cut-in vehicle. The input device interface 120 may be configured to receive the radar signal and pass the radar signal to the processing device 130. The input device interface 120 may be configured to communicate with the radar system 110 using any communication protocol, including a controller area network (CAN) bus.

The trigger module 125 may be programmed to output a trigger signal that enables the system 105 to detect the potential cut-in vehicle only when certain criteria are met. Example criterion may include when the host vehicle 100 is travelling at a low speed, whether the host vehicle 100 is close to the front vehicle, and whether the host vehicle 100 is travelling substantially straight (e.g., not turning). The trigger module 125 may compare the speed of the host vehicle 100 to a speed threshold and the distance to the front vehicle to a range threshold. If the speed and distance are both below their respective thresholds, and if the host vehicle 100 is not turning, the trigger module 125 may output the trigger signal. An example speed threshold may be, e.g., 15 kph and an example range threshold may be, e.g., 20 m. Whether the vehicle is turning may be determined by comparing a yaw rate to a yaw threshold. An example yaw threshold may include, e.g., 0.5 degrees. The speed threshold, the range threshold, and the yaw threshold may have different values, however.

The processing device 130 may be programmed to process the radar signals for potential cut-in vehicles, and under certain circumstances, select the potential cut-in vehicle as a new front vehicle. The processing device 130 may receive the trigger signal, which as discussed above indicates that the host vehicle 100 is both travelling at a relatively low speed and is at a relatively close range relative to the current front vehicle. The processing device 130 may be programmed to look for potential cut-in vehicles by, e.g., analyzing the radar signal, in response to receiving the trigger signal. That is, the processing device 130 may ignore radar signals if the trigger signal has not been received. Alternatively or in addition, the trigger signal may act as a virtual switch, in which case the processing device 130 may only receive the radar signal while the trigger signal is enabled.

Not all potential cut-in vehicles should be considered the new front vehicle, however. For example, the processing device 130 may mistake a parked car or other non-moving object as a potential cut-in vehicle. To avoid such a mistake, the processing device 130 may define a region of interest between the host vehicle 100 and the current front vehicle. Any object that enters the region of interest may be at least temporarily considered a potential cut-in vehicle.

Before selecting the potential cut-in vehicle as the new front vehicle, the processing device 130 may be programmed to consider whether the potential cut-in vehicle is moving or has moved recently or is stationary. With the help of this low-speed motion classification of objects, differentiation of different kind of objects can be made. Objects that are not moving or have not moved recently are not likely to attempt to cut between the host vehicle 100 and the front vehicle. Accordingly, stationary objects like parked cars, concrete pillars, traffic control devices, mailboxes, garbage cans, shrubs, drive-up ATM machines, construction barrels, fences, lampposts, tollbooths, drive-up ticket windows, etc., may not be considered the new front vehicle with the use of this specially designed low-speed motion classification.

For objects that are or have recently moved, the processing device 130 may be programmed to determine whether such objects have a negative range-rate. In other words, the processing device 130 may determine if the potential cut-in vehicle is slowing down or is travelling slower than the host vehicle. In this case, the host vehicle needs to take preventive measures earlier. Slowing down suggests that the vehicle is attempting to cut between the host vehicle 100 and the front vehicle. A vehicle that is accelerating is not likely to pose any problem to the host vehicle even if it cuts in. The host vehicle need not slow down. However, if relative speed between the host vehicle and the cut-in vehicle goes positive after the cut-in event, it may be considered as the primary target for short period of time or until the relative speed crosses a predefined threshold.

With these criteria met—the trigger signal received, a moving object entering the region of interest, the moving object slowing down, etc.—the processing device 130 may be programmed to select the potential cut-in vehicle as the new front vehicle.

Figure 3:
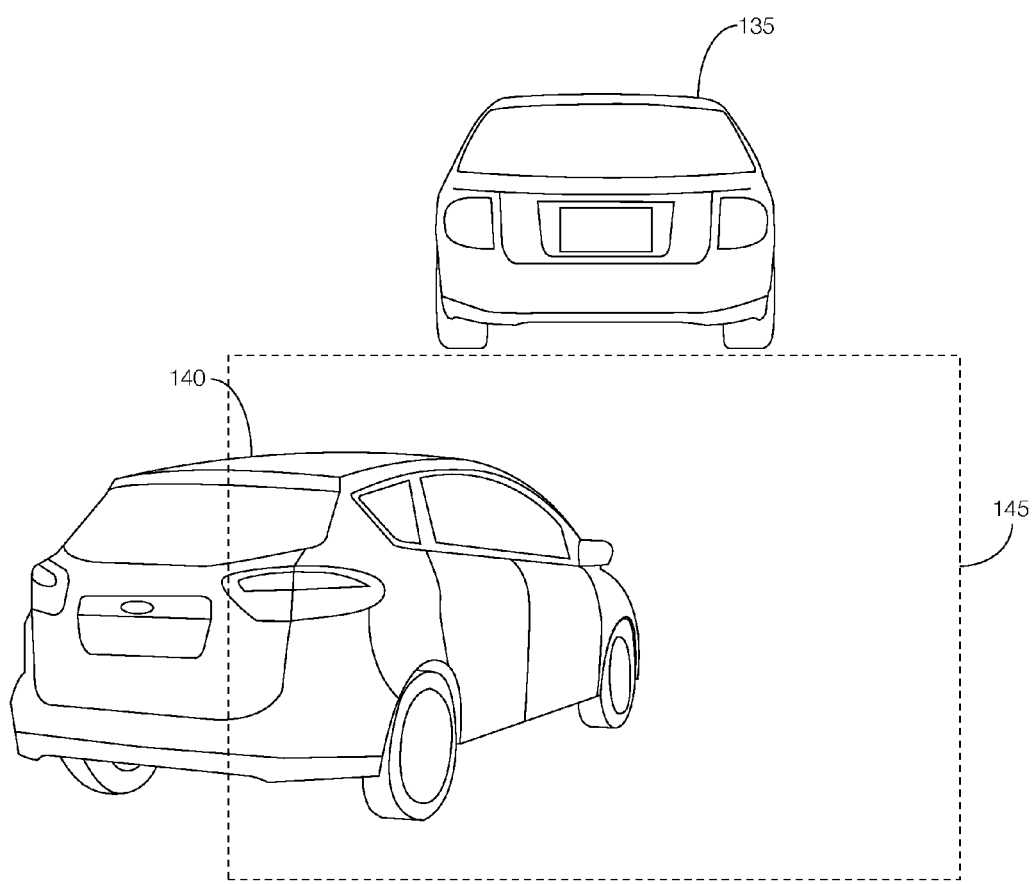

FIG. 3 illustrates a view from the host vehicle 100 during a potential cut-in. Although the potential cut-in vehicle 140 is approaching from the left, a similar approach may be implemented for potential cut-in vehicles 140 approaching from the right. Assuming the trigger module 125 criteria are met and the trigger signal has been output, the system 105 will look for potential cut-in vehicles 140. As shown in FIG. 3, the host vehicle 100 has detected the front vehicle 135 and defined the region of interest 145 between the front vehicle 135 and the host vehicle 100. The potential cut-in vehicle 140 is approaching and has entered the region of interest 145. The system 105 may determine whether the potential cut-in vehicle 140 is moving or has moved recently and whether the potential cut-in vehicle 140 is slowing down or has speed lower than the host vehicle (i.e., has a negative range rate). If the system 105 determines that the potential cut-in vehicle 140 is or was recently moving and is slowing down or is currently stopped, the system 105 may select the potential cut-in vehicle 140 as the new front vehicle. For purposes of autonomous operation, the host vehicle 100 may switch focus from the previous front vehicle 135 to the new front vehicle.

Figure 4:
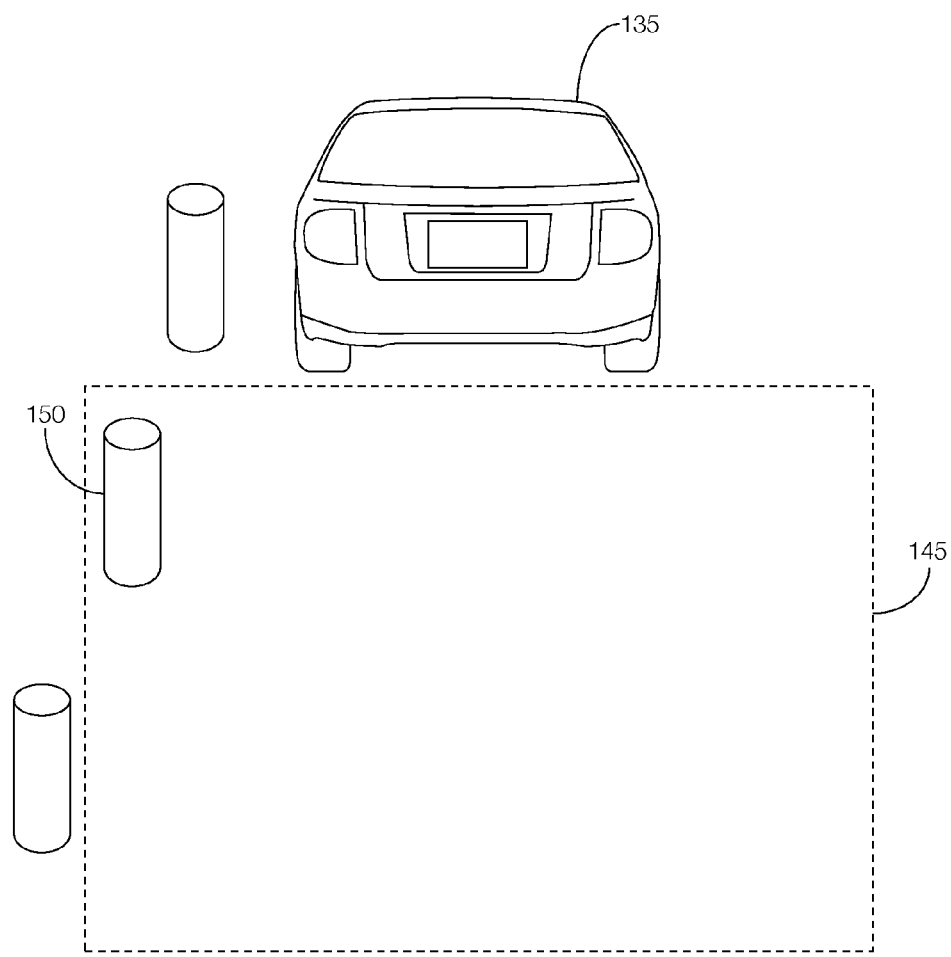

FIG. 4 illustrates a view from the host vehicle 100 during another potential cut-in. In FIG. 4, however, the potential cut-in vehicle 140 in the region of interest 145 is a stationary object 150, namely a concrete pillar. Because the stationary object 150 is not presently moving and was never observed moving by the radar system 110, the system 105 incorporated into the host vehicle 100 will not select the stationary object 150 as the new front vehicle. In other words, the stationary object 150 will be eliminated as a potential cut-in vehicle 140.

Figure 5:
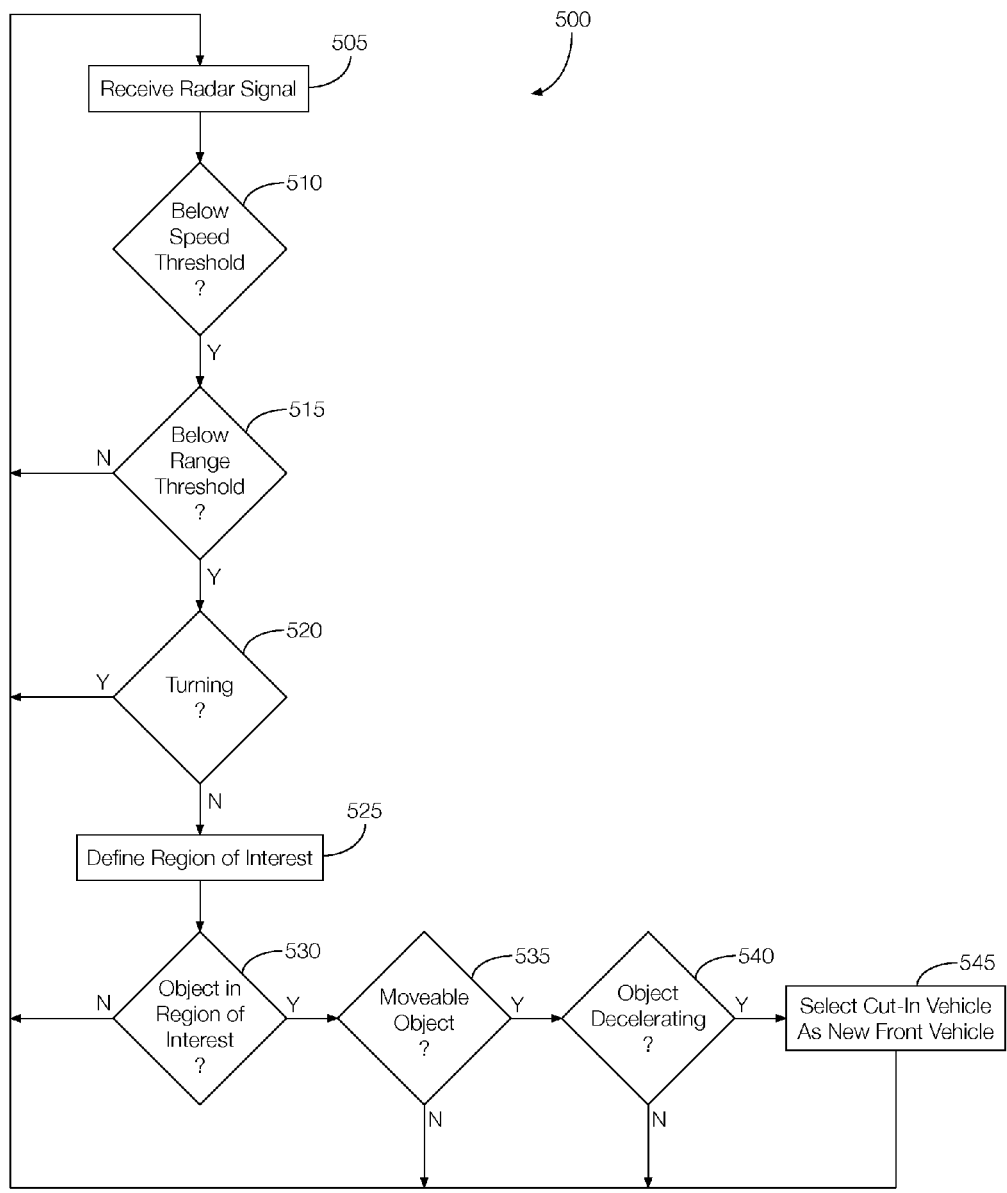
FIG. 5 is a flowchart of an example process that may be executed by the vehicle system of FIG. 2 to detect low-speed, close-range vehicle cut-ins.

FIG. 5 is a flowchart of an example process 500 that may be executed by the vehicle system 105 to detect low-speed, close-range vehicle cut-ins. The process 500 may be implemented on, e.g., input device interface 120, the trigger module 125, and the processing device 130 during autonomous or partially autonomous operation of the vehicle. The process 500 may run continuously so long as the vehicle is operating in an autonomous or partially autonomous mode and may end when the vehicle is turned off or is no longer running in the autonomous or partially autonomous mode.

At block 505, the processing device 130 may receive the radar signal. The radar signal, which may be generated and output by the radar system 110, may be transmitted to the vehicle system 105 via the input device interface 120. The input device interface 120 may pass the radar signal to the processing device 130 for processing.

At decision block 510, the trigger module 125 may determine whether the host vehicle 100 is travelling below a predetermined speed threshold. For instance, the trigger module 125 may compare the speed of the host vehicle 100 to the predetermined speed threshold. If the speed of the host vehicle 100 is below the predetermined threshold, the process 500 may continue at block 515. If the speed of the host vehicle 100 is not below the predetermined threshold, the process 500 may return to block 505.

At decision block 515, the trigger module 125 may determine whether the host vehicle 100 is close to the front vehicle 135. For instance, the trigger module 125 may compare the distance to the front vehicle 135 to a predetermined range threshold. If the distance is below the predetermined range threshold, the process 500 may continue at block 520. Otherwise, the process 500 may return to block 505.

At decision block 520, the trigger module 125 may determine whether the host vehicle 100 is turning. For instance, the trigger module 125 may compare an angle of the host vehicle 100 to a predetermined yaw threshold. If the angle exceeds the predetermined yaw threshold, the trigger module 125 may conclude that the host vehicle 100 is turning, in which case the process 500 may return to block 505. If the host vehicle 100 is travelling relatively straight, i.e., if the angle of the host vehicle 100 is below the predetermined yaw threshold, the trigger module 125 may output the trigger signal and the process 500 may continue at block 525.

At block 525, the processing device 130 may define the region of interest 145. The region of interest 145 may be defined as the space between the front vehicle 135 and the host vehicle 100. After the region of interest 145 is defined, the process 500 may continue at block 530.

At decision block 530, the processing device 130 may determine whether any potential cut-in vehicles 140 have entered the region of interest 145 defined at block 525. Potential cut-in vehicles 140 may be detected from the radar signal. If a potential cut-in vehicle 140 is detected, the process 500 may continue at block 535. If no potential cut-in vehicles 140 are detected, the process 500 may return to block 505.

At decision block 535, the processing device 130 may determine whether the potential cut-in vehicle 140 is a moveable object, meaning the processing device 130 may determine whether the potential cut-in vehicle 140 has been observed to be moving. By determining whether the potential cut-in vehicle 140 is a moveable object, the processing device 130 may eliminate stationary objects like parked cars, concrete pillars, traffic control devices, mailboxes, garbage cans, shrubs, drive-up ATM machines, construction barrels, fences, lampposts, tollbooths, drive-up ticket windows, etc., as potential cut-in vehicles 140. If the potential cut-in vehicle 140 is a moveable object, the process 500 may continue at block 540. If the potential cut-in vehicle 140 is stationary, and was never observed moving, the process 500 may return to block 505.

At decision block 540, the processing device 130 may determine whether the potential cut-in vehicle 140 is slowing down. A potential cut-in vehicle 140 that is slowing down or is moving at a lower speed than the host vehicle may be of more concern than a potential cut-in vehicle 140 that is accelerating or traveling at a constant velocity. If the processing device 130 determines that the potential cut-in vehicle 140 is slowing down, the process 500 may continue at block 545. If the potential cut-in vehicle 140 is accelerating or traveling at a constant velocity, the process 500 may continue at block 505.

At block 545, the processing device 130 may select the potential cut-in vehicle 140 as the new front vehicle. The process 500 may continue at block 505 after the new front vehicle has been selected.

With the system 105 described above, for purposes of autonomous or partially autonomous operation of the host vehicle 100, the host vehicle 100 will decelerate or stop to allow the potential cut-in vehicle 140 to occupy the region of interest 145 and will continue operation based on the movement of the new front vehicle. Such operation may include lateral and longitudinal decisions.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
an input device interface configured to receive a radar signal;
a processing device programmed to define a region of interest between a host vehicle and an initial front vehicle, detect a potential cut-in vehicle in the region of interest, select the potential cut-in vehicle as a new front vehicle based at least in part on whether the potential cut-in vehicle is slowing down; and
an autonomous mode controller programmed to autonomously control the host vehicle according to the new front vehicle.

2. The vehicle system of claim 1, wherein the processing device is programmed to detect the initial front vehicle from the radar signal.

3. The vehicle system of claim 1, wherein the processing device is programmed to define the region of interest based at least in part on a location of the initial front vehicle relative to the host vehicle.

4. The vehicle system of claim 1, wherein the processing device is programmed to detect the potential cut-in vehicle from the radar signal.

5. The vehicle system of claim 1, wherein the processing device is programmed to select the potential cut-in vehicle as the new front vehicle based on a speed of the potential cut-in vehicle.

6. The vehicle system of claim 1, wherein the processing device is programmed to select the potential cut-in vehicle as the new front vehicle based on whether the potential cut-in vehicle is moving or stationary.

7. The vehicle system of claim 1, further comprising a trigger module programmed to output a trigger signal, wherein the processing device is programmed to select the potential cut-in vehicle as the new front vehicle in accordance with the processing device receiving the trigger signal.

8. The vehicle system of claim 7, wherein the trigger module is programmed to output the trigger signal if a speed of the host vehicle is below a predetermined threshold.

9. The vehicle system of claim 7, wherein the trigger module is programmed to output the trigger signal if a distance between the front vehicle and the host vehicle is below a predetermined threshold.

10. A vehicle system comprising:
a radar system configured to output a radar signal representing an initial front vehicle and a potential cut-in vehicle;
an input device interface configured to receive the radar signal;
a processing device programmed to detect the initial front vehicle and the potential cut-in vehicle from the radar signal, define a region of interest between a host vehicle and the initial front vehicle, detect that the potential cut-in vehicle has entered the region of interest, select the potential cut-in vehicle as a new front vehicle based at least in part on whether the potential cut-in vehicle is slowing down; and
an autonomous mode controller programmed to autonomously control the host vehicle according to the new front vehicle.

11. The vehicle system of claim 10, wherein the processing device is programmed to select the potential cut-in vehicle as the new front vehicle based on a speed of the potential cut-in vehicle.

12. The vehicle system of claim 10, wherein the processing device is programmed to select the potential cut-in vehicle as the new front vehicle based on whether the potential cut-in vehicle is moving or stationary.

13. The vehicle system of claim 10, further comprising a trigger module programmed to output a trigger signal, wherein the processing device is programmed to select the potential cut-in vehicle as the new front vehicle in accordance with the processing device receiving the trigger signal.

14. The vehicle system of claim 13, wherein the trigger module is programmed to output the trigger signal if a speed of the host vehicle is below a predetermined threshold.

15. The vehicle system of claim 13, wherein the trigger module is programmed to output the trigger signal if a distance between the initial front vehicle and the host vehicle is below a predetermined threshold.

16. A method comprising:
- receiving a radar signal representing an initial front vehicle and a potential cut-in vehicle;
- defining a region of interest between a host vehicle and the initial front vehicle;
- detecting that the potential cut-in vehicle has entered the region of interest and is slowing down;
- selecting the potential cut-in vehicle as a new front vehicle as a result of detecting that the potential cut-in vehicle is slowing down; and
- autonomously controlling the host vehicle according to the new front vehicle.

17. The method of claim 16, wherein selecting the potential cut-in vehicle as a new front vehicle includes determining whether the potential cut-in vehicle is slowing down, whether the potential cut-in vehicle is moving, and whether the potential cut-in vehicle is stationary.

18. The method of claim 16, further comprising receiving a trigger signal prior to selecting the potential cut-in vehicle as the new front vehicle, wherein the trigger signal is received if a speed of the host vehicle is below a predetermined threshold and if a distance between the initial front vehicle and the host vehicle is below a predetermined threshold.

* * * * *